United States Patent [19]
Minowa et al.

[11] Patent Number: 5,571,594
[45] Date of Patent: Nov. 5, 1996

[54] ELECTRONIC COMPONENT CHIP HOLDER INCLUDING TWO ADHESIVE SURFACES HAVING DIFFERENT ADHESIVENESS

[75] Inventors: Kenji Minowa; Norio Sakai; Tetsuro Saito; Toshimi Yoshimura, all of Kyoto, Japan

[73] Assignee: Murata Manufacturing Co., Ltd., Japan

[21] Appl. No.: 339,480

[22] Filed: Nov. 14, 1994

Related U.S. Application Data

[60] Continuation of Ser. No. 105,022, Aug. 10, 1993, abandoned, which is a division of Ser. No. 855,202, Mar. 20, 1992, abandoned.

[30] Foreign Application Priority Data

Mar. 20, 1991  [JP]  Japan ........................................ 3-55256

[51] Int. Cl.$^6$ .................................................. H01L 21/68
[52] U.S. Cl. ................ 428/138; 428/343; 428/156; 428/137; 428/167; 428/909; 118/423; 118/428; 118/500; 414/941; 269/903; 29/740; 206/710; 206/713
[58] Field of Search ................................. 428/343, 156, 428/137, 167, 138, 909; 118/423, 428, 500; 414/941; 269/903; 29/740; 206/710, 713

[56] References Cited

U.S. PATENT DOCUMENTS

| | | | |
|---|---|---|---|
| 3,648,362 | 3/1972 | Oshimu et al. | 29/604 |
| 3,655,496 | 4/1972 | Ettre et al. | 29/740 |
| 3,658,618 | 4/1972 | Gramann | 156/235 |
| 3,899,379 | 8/1975 | Wanesky | 156/80 |
| 4,050,976 | 9/1977 | Reiters | 156/233 |
| 4,381,321 | 4/1983 | Braden | 427/79 |
| 4,395,184 | 7/1983 | Braden | 414/417 |
| 4,544,446 | 10/1985 | Cady | 156/639 |
| 4,584,039 | 4/1986 | Shea | 156/150 |
| 4,859,498 | 8/1989 | Yamaguchi | 427/96 |
| 4,887,762 | 12/1989 | Baker | 228/260 |
| 4,900,586 | 2/1990 | Kanamori et al. | 427/125 |
| 4,941,255 | 7/1990 | Bull | 29/833 |
| 5,007,534 | 4/1991 | Tamaki et al. | 206/329 |
| 5,017,255 | 5/1991 | Calhoun et al. | 156/230 |
| 5,120,577 | 6/1992 | Yamaguchi et al. | 427/282 |
| 5,261,986 | 11/1993 | Kawabata et al. | 156/235 |
| 5,383,997 | 1/1995 | Minowa et al. | 156/235 |

FOREIGN PATENT DOCUMENTS 62-140720  9/1987  Japan.

*Primary Examiner*—William Watkins
*Attorney, Agent, or Firm*—Ostrolenk, Faber, Gerb & Soffen, LLP

[57] ABSTRACT

In order to properly hold a number of miniaturized electronic component chips so that processing such as formation of external electrodes can be efficiently performed, a holder having an adhesive face to be stuck to first end surfaces of a number of electronic component chips for holding the electronic component chips is employed. The number of electronic component chips being held by the holder are dipped in electrode paste, so that external electrodes are formed on second end surfaces thereof. Then, an adhesive face of another holder having stronger adhesion than the adhesive face of the first holder is stuck to the electronic component chips, whereby the number of electronic component chips are simultaneously transferred to this holder. The first end surfaces are then also dipped in electrode paste to form external electrodes thereon.

26 Claims, 5 Drawing Sheets

ELECTRONIC COMPONENT CHIP HOLDER INCLUDING TWO ADHESIVE SURFACES HAVING DIFFERENT ADHESIVENESS

This is a continuation of application Ser. No. 08/105,022 abandoned filed on Aug. 10, 1993, which was a division of application Ser. No. 07/855,202, filed Mar. 20, 1992 abandoned.

BACKGROUND OF THE INVENTION

1. Field of the Invention

The present invention relates to a combination of electronic component chip holders which are advantageously employed for carrying out a method of handling electronic component chips.

2. Description of the Background Art

FIG. 10 is a perspective view showing an exemplary electronic component chip 1, to which the present invention can be applied. The electronic component chip 1 may be a capacitor chip such as a multilayer ceramic capacitor, a resistor chip, or an inductor chip, for example.

The electronic component chip 1 has first and second end surfaces 2 and 3, which are opposite to each other. A first end portion of the electronic component chip 1 including the first end surface 2 is provided with an external electrode 4, while a second end portion including the second end surface 3 is provided with another external electrode 5. Throughout the specification, the term "electronic component chip" includes a finished electronic component chip which is already provided with the external electrodes 4 and 5, as well as a semifinished electronic component chip which is not yet provided with the external electrode 4 and/or 5.

FIG. 11 shows an electronic component chip holder 6, which has generally been employed for forming external electrodes 4 and 5 on such electronic component chips 1. Such a holder 6 is disclosed in U.S. Pat. Nos. 4,395,184 and 4,381,321.

The holder 6 is in the form of a plate as a whole, and provided with a number of receiving portions 7, which are defined by through holes, for receiving the electronic component chips 1, in order to efficiently carry out a step of forming external electrodes.

FIG. 12 shows a section of the holder 6. This holder 6 comprises cores 8 which are covered with an elastic member 9, and the aforementioned receiving portions 7 are defined by through holes which are formed to pass through the elastic member 9. Thus, the electronic component chips 1 inserted in the receiving portions 7 are held by elasticity of the elastic member 9.

In order to form the external electrodes 4 and 5 on the electronic component chips 1, the following operation is carried out:

First, the electronic component chips 1 are inserted in the receiving portions 7 of the holder 6, so that a plurality of electronic component chips 1 are held by the holder 6 as shown in FIG. 12. An orientation device and pushers, which are not shown in the figure, can be employed for inserting the electronic component chips 1 in the receiving portions 7.

On the other hand, electrode paste 11 is applied onto a surface plate 10 in a prescribed thickness.

Then, the holder 6 is moved toward the surface plate 10 as shown by arrow 12, to dip the electronic component chips 1 in the electrode paste 11. Thus, the external electrodes 4 are formed on first end portions of the electronic component chips 1 including the first end surfaces 2, for example.

The external electrodes 4 formed by the electrode paste 11 are dried.

The electronic component chips 1 are extruded by pushers toward an opposite surface of the holder 6 through the through holes defining the receiving portions 7, and held in a state exposing the second end portions including the second end surfaces 3.

A step substantially similar to that shown in FIG. 12 is carried out to form the other external electrodes 5.

While such a holder 6 is adapted to handle a number of miniature electronic component chips, recent development of miniaturization of electronic component chips sometimes leads to difficulty in employment of such a holder 6. Since the receiving portions 7 of the holder 6 must be reduced in inner diameter following reduction in size of the electronic component chips, it is difficult to manufacture the holder 6 itself. Further, pushers for inserting and transferring the electronic component chips in and from the receiving portions 7 of the holder 6 must have operating portions which are smaller in diameter than the receiving portions 7. Thus, the operating portions of the pushers are made so insufficient in strength that it is difficult to properly use the same. In addition, parts of the electronic component chips inserted in the receiving portions 7 are reduced in length, and hence it is difficult to hold the electronic component chips by the holder 6.

While the above description is made in relation to the step of forming external electrodes on the electronic component chips, a similar problem may also be caused in a step of performing processing other than formation of external electrodes on the electronic component chips.

On the other hand, Japanese Utility Model Laying-Open No. 62-140720 (1987) describes a holder for holding electronic component chips with adhesion, for measuring characteristics of the electronic component chips. This holder comprises an elastic member of silicone rubber, for example, having viscosity at least on its surface, to hold electronic component chips on the surface of the elastic member with adhesion. Terminals for measurement are brought into contact with the electronic component chips held in such a manner, to measure prescribed electric characteristics of the electronic component chips.

SUMMARY OF THE INVENTION

Accordingly, an object of the present invention is to provide a combination of electronic component chip holders, which can properly hold and transfer electronic component chips even if the same are miniaturized.

Provided according to the present invention is a combination of a first electronic component chip holder having a first adhesive face which is stuck to electronic component chips for holding the electronic component chips and a second electronic component chip holder having a second adhesive face which provides adhesion being stronger than that provided by the first adhesive force.

An inventive handling method is applied to electronic component chips having first and second end surfaces which are opposite to each other for performing prescribed processing on respective ones of first end portions including the first end surfaces and second end portions including the second end surfaces, and in order to solve the aforementioned technical problems, this method comprises the steps of:

(1) preparing a first electronic component chip holder having a first adhesive face which is stuck to prescribed surfaces of electronic component chips for holding the electronic component chips and a second electronic component chip holder having a second adhesive face which provides adhesion stronger than that provided by the first adhesive face, (2) sticking the first adhesive face of the first electronic component chip holder to the first end surfaces of the electronic component chips for holding the electronic component chips by the first electronic component chip holder, (3) performing prescribed processing on the second end portions of the electronic component chips which are held by the first electronic component chip holder, (4) moving the first electronic component chip holder holding the electronic component chips toward the second electronic component chip holder for sticking the second adhesive face to the second end surfaces of the electronic component chips, (5) separating the first and second electronic component chip holders from each other for holding the electronic component chips by the second electronic component chip holder, and (6) performing prescribed processing on the first end portions of the electronic component chips which are held by the second electronic component chip holder.

Throughout the specification, the "end surfaces" and "end portions" of the electronic component chips are not restricted to the end surfaces 2 and 3 which are located on longitudinal ends of the electronic component chip 1 and the end portions including the end surfaces 2 and 3 as shown in FIG. 10, but also include "end surfaces" and "end portions" which are located on cross-directional and perpendicular ends.

Each of the electronic component chip holders according to the present invention holds the electronic component chips with adhesion provided by its adhesive face. Thus, each electronic component chip holder need only be provided with such an adhesive face, whereby its structure is remarkably simplified.

Further, each electronic component chip holder can hold the electronic component chips with no regard for the sizes thereof. Further, each electronic component chip holder can hold the electronic component chips by merely sticking the adhesive face to the electronic component chips, whereby the operation for holding the electronic component chips is extremely simplified.

In addition, each electronic component chip is held by each electronic component chip holder, whose adhesive face is stuck to either end surface thereof. Thus, the other end surface of each electronic component chip is so that it is possible to perform prescribed processing steps such as formation of an external electrode on the end portion including the other end surface with no trouble.

Further, each electronic component chip holder according to the present invention requires no specific structure such as through holes for receiving electronic component chips, but the overall adhesive face can be used for holding the electronic component chips. Thus, a single electronic component chip holder can be applied to various sizes of electronic component chips. When a plurality of electronic component chips are held, for example, it is possible to arbitrarily select the state of distribution of the electronic component chips held by the electronic component chip holder.

In the inventive method of handling electronic component chips, the aforementioned combination of electronic component chip holders is employed. Therefore, the inventive handling method also has the function/effect of each electronic component chip holder.

In the inventive handling method, first and second electronic component chip holders are employed. The first electronic component chip holder has a first adhesive face, while the second electronic component chip holder has a second adhesive face. The second adhesive face is so set as to provide adhesion which is stronger than that provided by the first adhesive face. Therefore, electronic component chips are first held by the first electronic component chip holder, so that respective end portions thereof are successively processed in a prescribed manner. In this state, prescribed processing is performed on end portions of the electronic component chips, which are then held by the second electronic component chip holder so that the other end portions are subjected to prescribed processing. The electronic component chips can be efficiently transferred from the first electronic component chip holder to the second electronic component chip holder on the basis of the aforementioned difference in adhesion. Namely, the second adhesive face of the second electronic component chip holder is stuck to the electronic component chips which are held by the first electronic component chip holder, and thereafter the second electronic component chip holder is separated from the first electronic component chip holder, so that the electronic component chips can be held by the second electronic component chip holder. Therefore, when a plurality of electronic component chips are handled, for example, it is possible to simultaneously transfer such electronic component chips to the second electronic component chip holder while maintaining the state of arrangement on the first electronic component chip holder.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
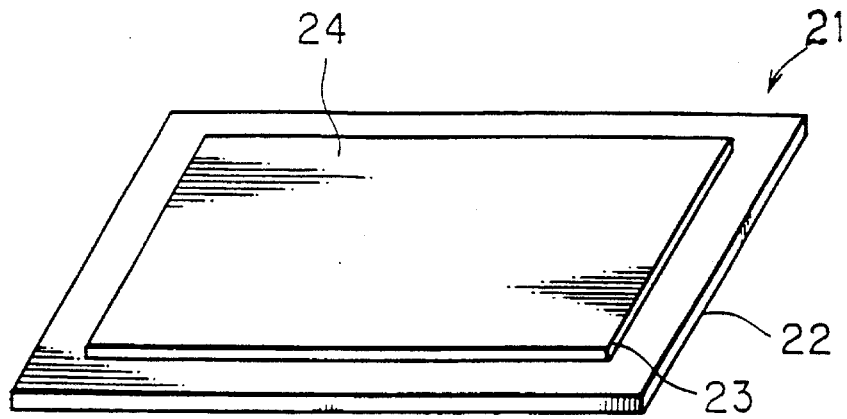
FIG. 1 is a perspective view showing an electronic component chip holder which is employed in an embodiment of the present invention.

FIG. 1 is a perspective view showing an electronic component chip holder 21 which is employed in an embodiment of the present invention. The holder 21 comprises a plate-type body 22 which is made of a material such as a metal or resin, for example. An adhesive film 23 is formed on the body 22, thereby defining an adhesive face 24 on the surface of the adhesive film 23.

According to this embodiment, the adhesive film 23 is formed on an elastic body such as rubber, for example. In this case, the adhesive face 24 may be provided from the stickiness of the elastic-body itself, such as rubber. Alternatively, the elastic body, such as rubber, may be coated with another adhesive to provide the adhesive face 24.

The adhesive film 23 may be independently formed in another place, and then pasted on the body 22. Alternatively, the adhesive film 23 may be formed on the body 22.

When the adhesive film 23 is formed by an elastic body as described above, the adhesive film 23 is deformed against its own elasticity when electronic component chips are pressed against the adhesive face 24 to be held by the same, so that the adhesive face 24 can be reliably brought into contact with the electronic component chips while advantageously absorbing dimensional errors between the electronic component chips, as described later. Thus, the adhesive face 24 has improved reliability for adhesively holding the electronic component chips. When such an advantage is not desired, however, the adhesive face 24 may be formed by coating the surface of a rigid body with an adhesive, or pasting a pressure sensitive adhesive double coated tape onto such a surface, for example.

Figure 10:
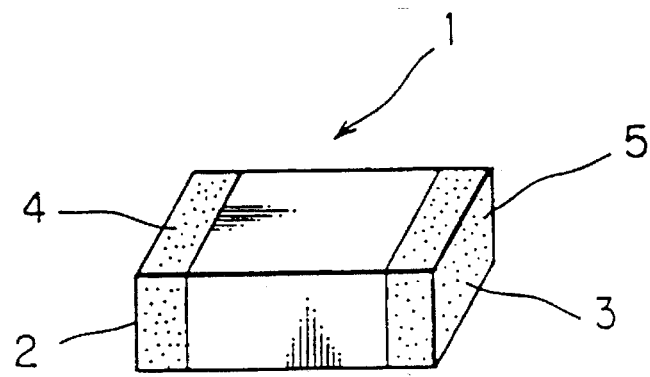
FIG. 10 is a perspective view showing an electronic component chip 1 to which the present invention is applied.
Figure 11:
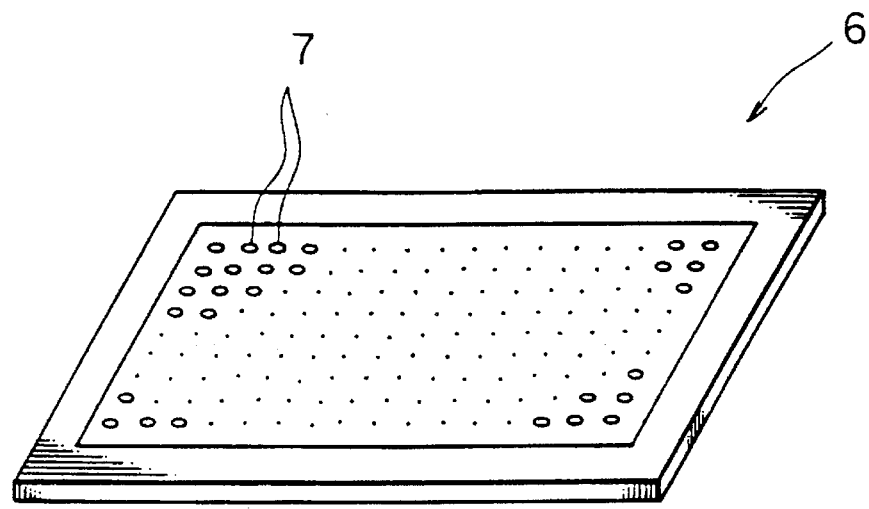
FIG. 11 is a perspective view showing a conventional electronic component chip holder 6.
Figure 12:
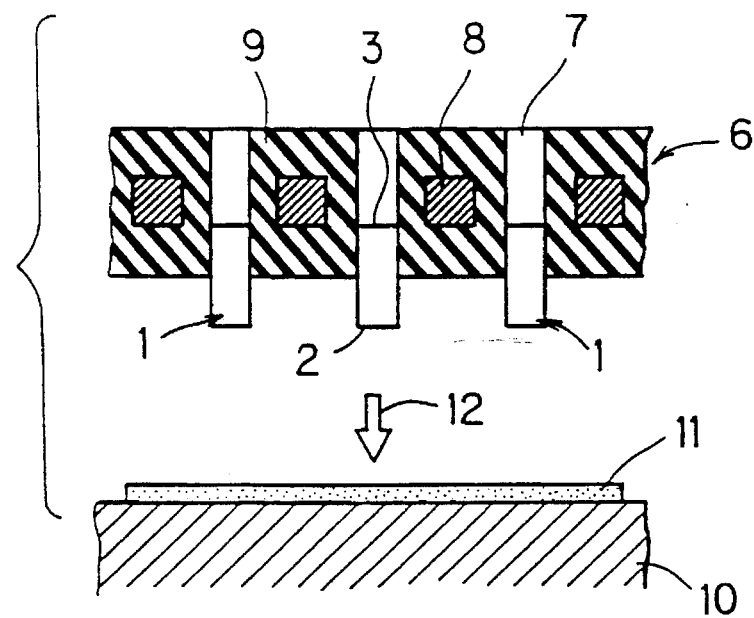
FIG. 12 is an illustrative sectional view for illustrating a conventional external electrode forming method for electronic component chips.

With reference to FIGS. 2 to 7, a method of forming external electrodes 4 and 5, for example, on electronic component chips 1 such as that shown in FIG. 10, is now described. In this method, two types of electronic component chip holders are prepared, each having the structure shown in FIG. 1. Namely, a first electronic component chip holder 21a shown in FIG. 2, for example, and a second electronic component chip holder 21b shown in FIG. 6, for example, are prepared. The first and second holders 21a and 21b comprise bodies 22a and 22b and adhesive films 23a and 23b of elastic bodies, such as rubber, respectively. A first adhesive face 24a is defined on the adhesive film 23a of the first holder 21, while a second adhesive face 24b is defined on the adhesive film 23b of the second holder 21b. The second adhesive face 24b is so set as to provide adhesion which is stronger than that provided by the first adhesive face 24a.

Figure 2:
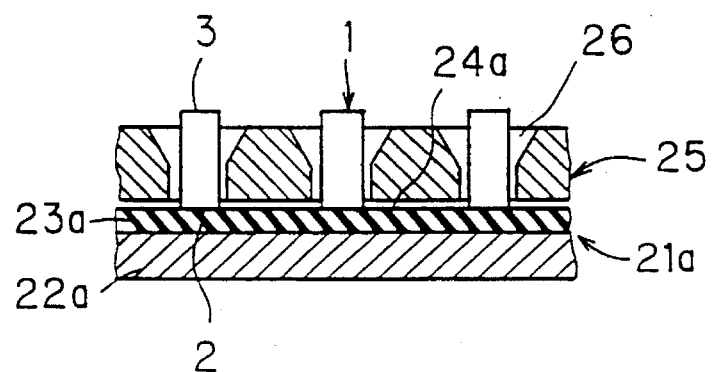
FIG. 2 is an illustrative sectional view showing a first step included in an external electrode forming method which is carried out using the holder shown in FIG. 1.

As shown in FIG. 2, an orientation device 25 is overlapped on the first holder 21a, and a plurality of electronic component chips 1 are placed in the orientation device 25 and vibrated to be directed in a prescribed direction in orienting portions 26 which are provided in the orientation device 25. Inlets of the orienting portions 26 are preferably tapered.

Figure 3:
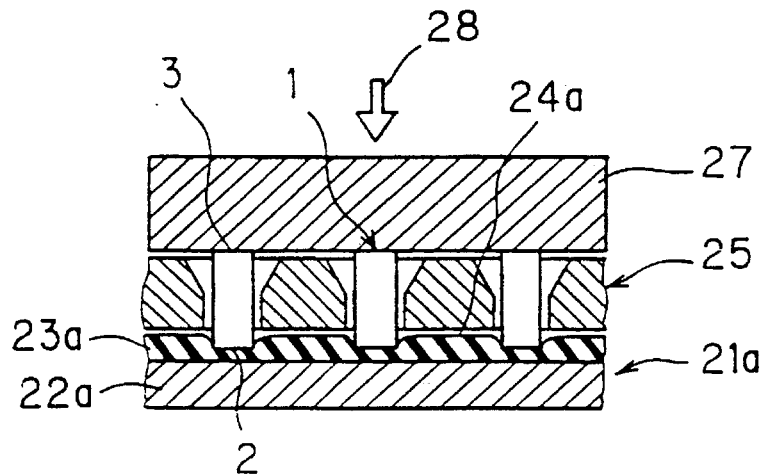
FIG. 3 is an illustrative sectional view showing a second step included in the external electrode forming method.

Then, a flat pressing plate 27 is employed as shown in FIG. 3, to press the respective electronic component chips 1 against the first holder 21a as shown by arrow 28. Thus, the first adhesive face 24a of the first holder 21a is stuck to first end surfaces 2 of the respective electronic component chips 1. Therefore, the electronic component chips 1 are held by the first holder 21a.

When the adhesive face 24a is defined on the surface of the adhesive film 23a which is formed by an elastic body such as rubber as shown in this embodiment, it is possible to advantageously absorb longitudinal dimensional errors, which may be caused between the plurality of electronic component chips 1, when the step shown in FIG. 3 is carried out. Thus, no specific electronic component chip 1 is damaged or separated from the adhesive face 24a.

Figure 4:
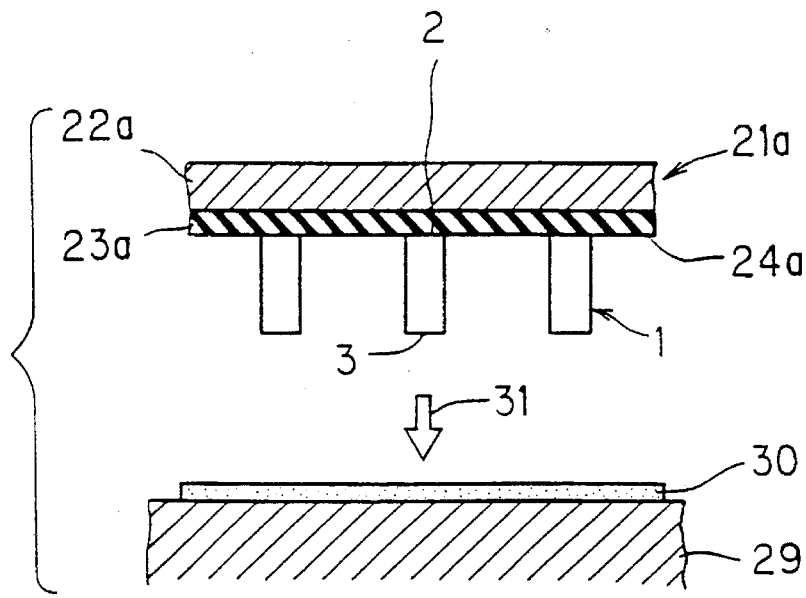
FIG. 4 is an illustrative sectional view showing a third step included in the external electrode forming method.

Then, electrode paste 30 is applied to a surface plate 29 in a prescribed thickness, as shown in FIG. 4. On the other hand, the holder 21a is oriented to downwardly direct the electronic component chips 1 which are held by the same. In this state, the holder 21a is moved toward the surface plate 29 as shown by arrow 31, whereby second end portions of the electronic component chips 1 including second end surfaces 3 are dipped in the electrode paste 30.

Figure 5:
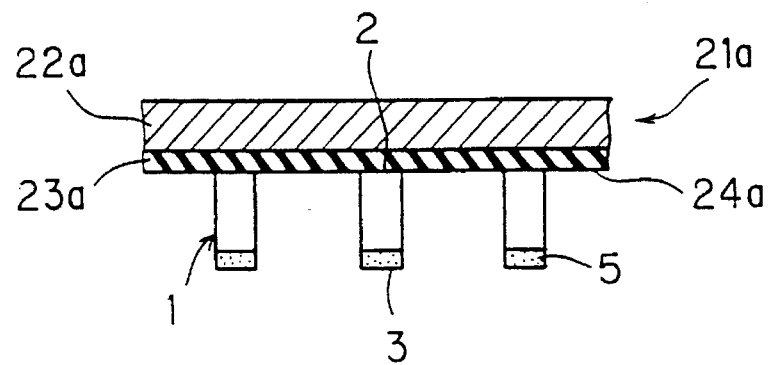
FIG. 5 is an illustrative sectional view showing a fourth step included in the external electrode forming method.

Then, the electronic component chips 1 are raised up from the electrode paste 30. Thus, external electrodes 5 are formed on the second end portions of the respective electronic component chips 1, as shown in FIG. 5. The external electrodes 5 thus formed by the electrode paste 30 are then dried.

Figure 6:
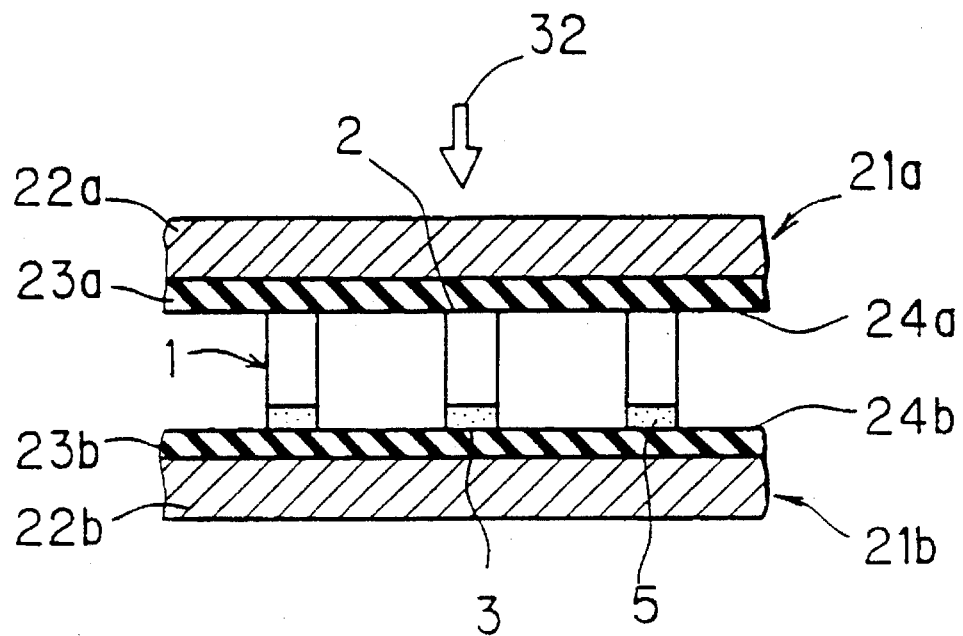
FIG. 6 is an illustrative sectional view showing a fifth step included in the external electrode forming method.

The first holder 21a holding the electronic component chips 1 is then moved towards the second holder 21b as shown by arrow 32 in FIG. 6, so that the second adhesive face 24b is stuck to the second end surfaces 3 of the electronic component chips 1. In this step, the electronic component chips 1 are pressed against the second holder 21b through the first holder 21a, similarly to the step shown in FIG. 3.

Figure 7:
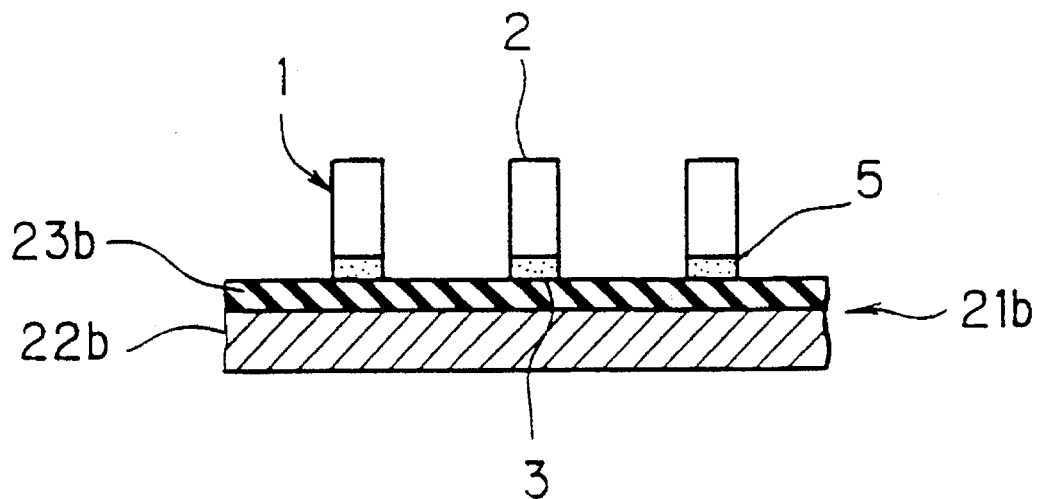
FIG. 7 is an illustrative sectional view showing a sixth step included in the external electrode forming method.

As described above, the adhesion provided by the second adhesive face 24b of the second holder 21b is selected to be stronger than that provided by the first adhesive face 24a of the first holder 21a. When the first and second holders 21a and 21b are separated from each other after the step shown in FIG. 6, therefore, the electronic component chips 1 are held by the second holder 21b, as shown in FIG. 7.

Then, steps substantially similar to those shown in FIGS. 4 and 5 are carried out in order to form external electrodes 4 on first end portions of the electronic component chips 1, which are held by the second holder 21b, including the first end surfaces 2.

Thus, the external electrodes 4 and 5 are formed on the first and second end portions of each electronic component chip 1, as shown in FIG. 10.

While the electronic component chips 1 are dipped in the electrode paste 30 to be provided with the external electrodes 4 and 5 in the aforementioned embodiment, such electrodes may alternatively be formed by another method such as plating, for example.

While the electronic component chips 1 are handled to be provided with the external electrodes 4 and 5 in the aforementioned embodiment, the electronic component chip holders and the method of handling electronic component chips according to the present invention are also applicable to processing other than external electrodes 4 and 5.

Figure 8:
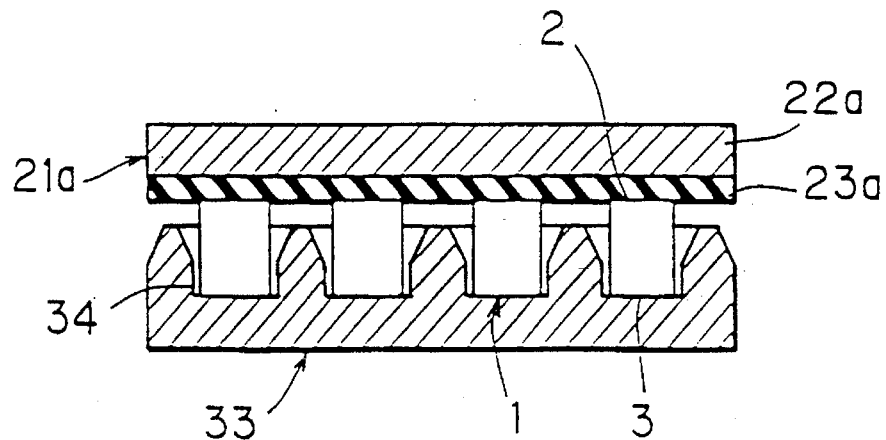
FIG. 8 is a sectional view of an orientation device 33 which is employed in another embodiment of the inventive method of handling electronic component chips, showing a step corresponding to that shown in FIG. 3.

Although the pressing plate 27, which is independent of the orientation device 25, is employed as shown in FIG. 3 in the aforementioned embodiment, an orientation device 33 having a configuration which is integrated with such a pressing plate 27 may alternatively be employed as shown in FIG. 8, to carry out the steps shown in FIGS. 2 and 3. Orientation device 33 has orienting portions 34 which are provided with bottoms. Referring to FIG. 8, elements corresponding to those shown in FIG. 3 are indicated by similar reference numerals, to omit redundant description.

Referring to FIG. 8, a plurality of electronic component chips 1 are placed on the orientation device 33 and vibrated to be inserted in a prescribed direction into the orienting portions 34. Electronic component chips 1 which are left on the top surface of the orientation device 33 are removed. Then, a holder 21a is arranged opposite to the orientation device 33. In this state, the holder 21a is moved towards the orientation device 33, whereby the adhesive film 23a is stuck to the electronic component chips 1. According to the embodiment shown in FIG. 8, since the step of inserting the electronic component chips 1 into the orienting portions 26, as shown in FIG. 2, and the step of pressing the electronic component chips 1 against the holder 21a, as shown in FIG. 3 can be continuously carried out, the production facilities can be simplified, and the productivity can be increased.

Figure 9:
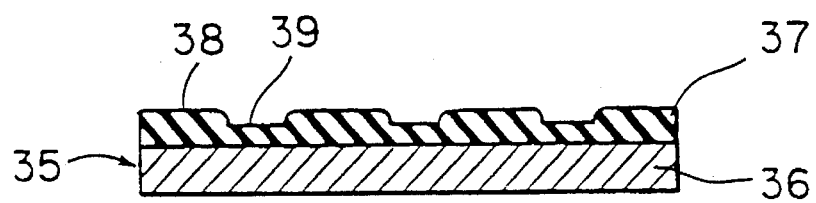
FIG. 9 is a sectional view showing an electronic component chip holder which is employed in still another embodiment of the present invention.

FIG. 9 shows another exemplary electronic component chip holder 21. The feature of this electronic component chip holder 35 resides in the configuration of an adhesive face 38 defined by an adhesive film 37 which is formed on its body 36. The adhesive face 38 is provided with a plurality of cavities 39. Dimensions of these cavities 39, which are adapted to enable correct location and further reliable fixation of electronic component chips, are preferably in conformity to those of the electronic component chips.

Although the present invention has been described and illustrated in detail, it is clearly understood that the same is by way of illustration and example only and is not to be taken by way of limitation, the scope of the present invention being limited only by the terms of the appended claims.

What is claimed is:

1. A kit of elements for use in a method of holding a plurality of electronic component chips while opposite ends of the electronic component chips are processed, the kit comprising:

a first electronic component chip holder including a first elastic body having a first adhesive surface being adapted to apply a first adhesive force to respective first ends of the electronic component chips for holding said electronic component chips while respective second opposite ends of the electronic component chips are being processed;

a second electronic component chip holder including a second elastic body having a second adhesive surface being adapted to apply a second adhesive force to said second ends of the electronic component chips to hold said electronic component chips on said second electronic component chip holder while respective first opposite ends are being processed, the second adhesive force applied by the second adhesive surface being stronger than the first adhesive force of said first adhesive surface, such that when said respective first ends of said electronic component chips are held by said first chip holder and said second adhesive surface is connected to said respective second opposite ends of said electronic component chips, the second adhesive force provided by the second adhesive surface is sufficiently greater than the first adhesive force so that the plurality of electronic component chips are transferred from said first electronic component chip holder to said second electronic component chip holder for permitting respective first ends of the electronic component chips to be processed.

2. The kit of claim 1, wherein first and second adhesive films are provided on said first and second elastic bodies, respectively, said first and second adhesive surfaces being defined by the surfaces of said respective first and second adhesive films.

3. The kit of claim 2, wherein said first and second adhesive films are made of materials having elasticity.

4. A kit in accordance with claim 1, wherein said first and second adhesive surfaces are provided with respective cavities for locating said electronic component chips.

5. A kit of elements for use in a method of holding a plurality of electronic component chips while opposite ends of said electronic component chips are processed, the kit comprising:

a first electronic component chip holder having a first adhesive surface being adapted to apply a first adhesive force to respective first ends of the electronic component chips for holding said electronic component chips while respective second opposite ends of the electronic component chips are being processed;

a second electronic component chip holder having a second adhesive surface being adapted to apply a second adhesive force to said second ends of the electronic component chips to hold said electronic component chips on said second electronic component chip holder, the second adhesive force applied by the second adhesive surface being stronger than the first adhesive force of said first adhesive surface, such that when said respective first ends of said electronic component chips are held by said first chip holder and said second adhesive surface is connected to said respective second ends of said electronic component chips, the second adhesive force provided by the second adhesive surface is sufficiently greater than the first adhesive force so that the plurality of electronic component chips are transferred from said first electronic component chip holder to said second electronic component chip holder for permitting respective first ends of the electronic component chips to be processed; and each of said first and second chip holders comprising an elastic portion, and a rigid support for supporting the elastic portion, the elastic portion of each of the first and second chip holders defining a respective one of the first and second adhesive surfaces.

6. The kit of claim 5, further comprising an orientation device adapted to be connected to at least one of said first and second adhesive surfaces, said orientation device having a plurality of apertures being shaped and located for receiving respective said electronic component chips and for orienting said chips when said chips are applied to one of said first and second chip holders.

7. The kit of claim 6, further comprising a pressing plate adapted to contact said orientation device to apply a force to said chips which are received in said apertures of said orientation device so as to apply said chips to said one of said first and second chip holders.

8. The kit of claim 6, wherein said apertures are tapered for guiding said chips into said apertures.

9. The kit of claim 6, wherein said apertures are closed at one end so as to provide a pressing surface at said closed end for pressing said chips which are received in said apertures of said orientation device so as to apply said chips to said first chip holder.

10. The kit of claim 1, further comprising an orientation device adapted to be connected to at least one of said first and second adhesive surfaces, said orientation device having a plurality of apertures being shaped and located for receiving respective said electronic component chips and for orienting said chips when said chips are applied to one of said first and second chip holders.

11. The kit of claim 1, further comprising a pressing plate adapted to contact said orientation device to apply a force to said chips which are received in said apertures of said orientation device so as to apply said chips to said one of said first and second chip holders.

12. The kit of claim 10, wherein said apertures are tapered for guiding said chips into said apertures.

13. The kit of claim 10, wherein said apertures are closed at one end so as to provide a pressing surface at said closed end for pressing said chips which are received in said apertures of said orientation device so as to apply said chips to said first chip holder.

14. A kit of elements for use in a method of holding a plurality of electronic component chips while opposite ends of said electronic component chips are processed, the kit comprising:

a first electronic component chip holder including a first rubber body having a first adhesive surface being adapted to apply a first adhesive force to respective first ends of the electronic component chips for holding said electronic component chips for permitting respective second opposite ends of the electronic component chips to be processed, the first electronic component chip holder including a first rigid support for supporting said first rubber body;

a second electronic component chip holder including a second rubber body having a second adhesive surface being adapted to apply a second adhesive force to said second ends of the electronic component chips to hold said electronic component chips on said second electronic component chip holder, the second electronic component chip holder including a second rigid support for supporting said second rubber body, the second adhesive force applied by the second adhesive surface being stronger than the first adhesive force of said first adhesive surface, such that when said respective first ends of said electronic component chips are held by said first chip holder and said second adhesive surface is connected to said respective second ends of said electronic component chips, the second adhesive force provided by the second adhesive surface is sufficiently greater than the first adhesive force so that the plurality of electronic component chips will be transferred from said first electronic component chip holder to said second electronic component chip holder for permitting respective first ends of the electronic component chips to be processed.

15. The kit of claim 14, wherein said first and second rigid supports of said first and second chip holders comprises a metal support plate.

16. The kit of claim 14, further comprising an orientation device adapted to be connected to at least one of said first and second adhesive surfaces, said orientation device having a plurality of apertures being shaped and located for receiving respective said electronic component chips and for orienting said chips when said chips are applied to one of said first and second chip holders.

17. The kit of claim 14, further comprising a pressing plate adapted to contact said orientation device to apply a force to said chips which are received in said apertures of said orientation device so as to apply said chips to said one of said first and second chip holders.

18. The kit of claim 14, wherein said apertures are tapered for guiding said chips into said apertures.

19. The kit of claim 14, wherein said apertures are closed at one end so as to provide a pressing surface at said closed end for pressing said chips which are received in said apertures of said orientation device so as to apply said chips to said first chip holder.

20. The kit of claim 1, wherein at least one of said first and second holders further comprises a rigid support for supporting a respective one of said first and second elastic bodies.

21. The kit of claim 20, wherein said rigid support comprises a metal support plate.

22. The kit of claim 1, wherein at least one of said first and second elastic bodies comprises a rubber member.

23. The kit of claim 5, wherein at least one of said first and second rigid supports comprises a metal support plate.

24. The kit of claim 5, wherein at least one of said first and second elastic bodies comprises a rubber member.

25. The kit of claim 14, wherein at least one of said first and second rigid supports comprises a metal support plate.

26. A kit of elements for use in a method of holding a plurality of electronic component chips while opposite ends of the electronic component chips are processed, the kit comprising:

a first electronic component chip holder having a first adhesive surface being adapted to apply a first adhesive force to respective first ends of the electronic component chips for holding said electronic component chips while respective second opposite ends of the electronic component chips are being processed;

a second electronic component chip holder having a second adhesive surface being adapted to apply a second adhesive force to said second ends of the electronic component chips to hold said electronic component chips on said second electronic component chip holder while respective first opposite ends are being processed, the second adhesive force applied by the second adhesive surface being stronger than the first adhesive force of said first adhesive surface, such that when said respective first ends of said electronic component chips are held by said first chip holder and said second adhesive surface is connected to said respective second opposite ends of said electronic component chips, the second adhesive force provided by the second adhesive surface is sufficiently greater than the first adhesive force so that the plurality of electronic component chips are transferred from said first electronic component chip holder to said second electronic component chip holder for permitting respective first ends of the electronic component chips to be processed;

at least one of said first and second electronic component chip holders including an elastic body and at least one of said first and second electronic component chip holders including a rigid support member for supporting a respective one of said first and second adhesive surfaces.

* * * * *